(12) United States Patent
Ishikawa et al.

(10) Patent No.: US 9,759,955 B2
(45) Date of Patent: Sep. 12, 2017

(54) LIQUID CRYSTAL DISPLAY DEVICE

(71) Applicant: Japan Display Inc., Tokyo (JP)

(72) Inventors: Tomokazu Ishikawa, Tokyo (JP); Yuki Kuramoto, Tokyo (JP); Saori Sugiyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 28 days.

(21) Appl. No.: 14/339,479

(22) Filed: Jul. 24, 2014

(65) Prior Publication Data
US 2015/0029432 A1   Jan. 29, 2015

(30) Foreign Application Priority Data

Jul. 25, 2013 (JP) .................... 2013-154598

(51) Int. Cl.
G02F 1/1334 (2006.01)
G02F 1/1339 (2006.01)
G02F 1/1333 (2006.01)

(52) U.S. Cl.
CPC ........ *G02F 1/13394* (2013.01); *G02F 1/1339* (2013.01); *G02F 1/133345* (2013.01)

(58) Field of Classification Search
CPC ... G02F 1/13394; G02F 1/1337; G02F 1/1341
See application file for complete search history.

(56) References Cited

U.S. PATENT DOCUMENTS

| | | | |
|---|---|---|---|
| 2004/0263740 A1* | 12/2004 | Sakakura ............ | H01L 51/5237 349/138 |
| 2006/0061719 A1 | 3/2006 | Tomioka et al. | |
| 2008/0129946 A1* | 6/2008 | Chan .................... | G02F 1/1339 349/153 |
| 2008/0239188 A1* | 10/2008 | Jung ..................... | G02F 1/1339 349/46 |
| 2010/0053512 A1* | 3/2010 | Taniguchi ............. | G02F 1/1339 349/106 |
| 2010/0149477 A1* | 6/2010 | Nagami ................ | G02F 1/1339 349/138 |
| 2010/0225865 A1* | 9/2010 | Tomioka ........... | G02F 1/133723 349/123 |

(Continued)

FOREIGN PATENT DOCUMENTS

| | | |
|---|---|---|
| JP | 2004-206091 A | 7/2004 |
| JP | 2007-304452 A | 11/2007 |
| JP | 2011-145535 A | 7/2011 |

*Primary Examiner* — Sang V Nguyen
(74) *Attorney, Agent, or Firm* — Typha IP LLC

(57) ABSTRACT

A liquid crystal display device includes: a TFT substrate including a TFT, an organic passivation film formed to cover the TFT, and an alignment film; and a counter substrate including a spacer and an alignment film. The TFT substrate and the counter substrate are bonded with a sealing material in a seal portion, with a liquid crystal interposed between the two substrates. A wall-like structure is formed in the seal portion of the counter substrate, in a direction parallel to a side of the counter substrate. A concave portion of the organic passivation film is formed at a position corresponding to the wall-like structure of the TFT substrate, in a direction parallel to the side of the TFT substrate. With this structure, a gap between the wall-like structure and the TFT substrate is increased to facilitate the movement of the sealing material before curing, to form the sealing material uniformly.

11 Claims, 5 Drawing Sheets

(56) References Cited

U.S. PATENT DOCUMENTS

| | | | |
|---|---|---|---|
| 2011/0007251 A1* | 1/2011 | Yamamoto | G02F 1/133514 349/108 |
| 2011/0134352 A1* | 6/2011 | Nakagawa | G02F 1/1339 349/43 |
| 2011/0176097 A1 | 7/2011 | Shiromoto et al. | |
| 2012/0120337 A1* | 5/2012 | Ji | G02F 1/13394 349/39 |
| 2012/0194494 A1* | 8/2012 | Jung | G02F 1/133723 345/208 |
| 2012/0314177 A1* | 12/2012 | Hyodo | G02F 1/133371 349/155 |
| 2013/0021573 A1* | 1/2013 | Lim | G02F 1/13394 349/155 |
| 2013/0057820 A1* | 3/2013 | Hyodo | G02F 1/1337 349/155 |
| 2014/0036189 A1* | 2/2014 | Yi | G02F 1/133512 349/43 |
| 2014/0043574 A1* | 2/2014 | Ichimura | G02F 1/1339 349/138 |

\* cited by examiner

LIQUID CRYSTAL DISPLAY DEVICE

CLAIM OF PRIORITY

The present application claims priority from Japanese Patent Application JP 2013-154598 filed on Jul. 25, 2013, the content of which is hereby incorporated by reference into this application.

BACKGROUND

The present invention relates to a display device, and more particularly, to a liquid crystal display device capable of preventing gap unevenness around the substrate periphery while ensuring the reliability of the seal portion, even with a narrow frame structure.

A liquid crystal display device includes a TFT substrate in which pixels each having a pixel electrode and a thin film transistor (TFT) are formed in a matrix. Further, a counter substrate is disposed opposite the TFT substrate, in which a color filter, and the like, is formed at the position corresponding to the pixel electrode of the TFT substrate. Further, a liquid crystal is interposed between the TFT substrate and the counter substrate. Then, the liquid crystal display device forms an image by controlling the amount of light transmitted through the liquid crystal molecules for each pixel.

Liquid crystal display device are flat and lightweight and have been applied in various fields. Small liquid crystal display devices are widely used in mobile phones, digital still cameras (DSC), or other portable devices. In the present specification, it is referred to as a liquid crystal display panel in which a liquid crystal is interposed between a TFT substrate and a counter substrate, with a lower polarizing plate attached below the TFT substrate and an upper polarizing plate attached above the counter substrate. Further, a liquid crystal display device includes a liquid crystal display panel, a backlight, and the like.

There is a strong demand for the small liquid crystal display panel with a large display area while keeping the profile small. In order to meet such a demand, the width from the end portion of the display area to the end portion of the liquid crystal display panel is reduced. Thus, it is necessary to have a so-called narrow frame.

A sealing material for bonding the TFT substrate and the counter substrate is formed in the frame area. Further, an alignment film is formed in the display area of the liquid crystal display device to provide initial alignment of liquid crystal. The alignment film is required to completely cover the display area, so that the coated area of the alignment film should be larger than the display area by a predetermined width. However, the bonding strength between the alignment film and the sealing material is small. Thus, if the alignment film is formed on the entire surface of the TFT substrate or the counter substrate, the reliability of the sealing material is reduced.

Thus, in the case of the narrow frame, it is necessary to limit the overlapping range so that the alignment film does not overlap the sealing material, or so as to prevent a major problem in the bonding strength even if the alignment film overlaps the sealing material. Japanese Unexamined Patent Application Publication No. 2007-304452 describes a structure in which a material having low compatibility with the alignment film is formed in the portion where the sealing material is formed on the TFT substrate or the counter substrate, in order to prevent contact between the sealing material and the alignment film, even if the alignment film is formed on the entire surface of the TFT substrate or the counter substrate. Japanese Unexamined Patent Application Publication No. 2011-145535 describes a structure in which a second alignment film, which is formed from other fast drying material, is formed in a bar shape prior to the formation of a first alignment film, in order to provide the profile of the first alignment film formed in the display area.

Incidentally, the alignment process of the alignment film includes two kinds of treatment: rubbing and photo alignment. Japanese Unexamined Patent Application Publication No. 2004-206091 describes a method for using photo alignment to (1) reduce alignment disorder caused by the complex step structure, and (2) prevent the influence of foreign matters or other substances caused by static electricity in the rubbing treatment, disorder in the pile of a rubbing cloth, or by the rubbing treatment.

SUMMARY

Examples of the material having low compatibility with the alignment film material forming the seal portion of the TFT substrate or the counter substrate as described in Japanese Unexamined Patent Application Publication No. 2007-304452, are an organic passivation film used on the TFT substrate side, and an overcoat film and the like used on the counter substrate side. However, it may be difficult for such materials to completely reject the alignment film material. In the method described in Japanese Unexamined Patent Application Publication No. 2011-145535, the first and second alignment films should be formed separately, which may lead to a problem of production costs.

As another method for providing the profile of the alignment film, there is a method for providing the profile of the alignment film by forming a difference in level on the overcoat film in the counter substrate. However, the thickness of the overcoat film is about 1 µm, and it is difficult to form a sufficient difference in level only by the overcoat film. Thus, a color filter is formed on the lower side of the overcoat film to form a difference in level by the thickness of the color filter.

However, the difference in level formed by such a method may not be enough to serve as a stopper of the alignment film. For example, the gap between the TFT substrate and the counter substrate is provided by a columnar spacer formed in the counter substrate. When the columnar spacer is formed, it is possible to control the profile of the alignment film by forming a wall-like alignment film stopper with the same material as the columnar spacer in the seal portion of the counter substrate.

It is more difficult to completely separate the alignment film from the sealing material as the frame area decreases. Thus, the frame area is reduced by allowing a portion of the alignment film to overlap the sealing material to the extent that the bonding strength of the sealing material is not substantially reduced. In this case, the wall-like alignment film stopper is formed in the seal portion.

The sealing material is a viscous solid before curing. When the TFT substrate and the counter substrate are bonded to each other with a gap provided by the columnar spacer, the width is increased to a predetermined range. At this time, if the wall-like alignment film stopper is present, the sealing material is prevented from spreading by the presence of the wall-like alignment film, resulting in an uneven gap in the seal portion or a reduction in the reliability of the seal portion.

The present invention is desirable to provide a structure in which the wall-like alignment film stopper, which is formed at the same time as the columnar spacer, is used on the counter substrate side, so as not to prevent the spread of the sealing material by the alignment film stopper, and to provide a structure for forming a stopper of the alignment film on the TFT substrate side.

The present invention is made to solve the above problems, specific means are as follows.

(1) A liquid crystal display device includes: a TFT substrate including a TFT, an organic passivation film formed to cover the TFT, and a first alignment film; and a counter substrate including a columnar spacer and a second alignment film. The TFT substrate and the counter substrate are bonded together with a sealing material in a seal portion. Then, a liquid crystal is interposed between the TFT substrate and the counter substrate. In the liquid crystal display device, a wall-like structure is formed in the seal portion of the counter substrate, in a direction parallel to a side of the counter substrate. Then, a concave portion of the organic passivation film is formed at a position corresponding to the wall-like structure of the TFT substrate, in a direction parallel to a side of the TFT substrate.

(2) In the liquid crystal display device described in (1), a portion of the sealing material overlaps the first alignment film or the second alignment film.

(3) A liquid crystal display device includes: a TFT substrate including a TFT, an organic passivation film formed to cover the TFT, and a first alignment film; and a counter substrate including a columnar spacer and a second alignment film. The TFT substrate and the counter substrate are bonded together with a sealing material in a seal portion. Then, a liquid crystal is interposed between the TFT substrate and the counter substrate. In the liquid crystal display device, a wall-like structure is formed in the seal portion of the counter substrate, in a direction parallel to a side of the counter substrate. A removal portion of the organic passivation film is formed at a position corresponding to the wall-like structure of the TFT substrate, in a direction parallel to a side of the TFT substrate.

(4) In the liquid crystal display device described in (3), another wall-like structure is formed in the seal portion of the counter substrate, in a direction parallel to the side of the counter substrate. Then, a concave portion of the organic passivation film is formed at a position corresponding to the other wall-like structure of the TFT substrate, in a direction parallel to the side of the TFT substrate.

(5) In the liquid crystal display device described in (4), a portion of the sealing material overlaps the first alignment film or the second alignment film.

According to the present invention, in the structure in which a portion of the sealing material and the alignment film overlap each other, it is possible to provide the profile of the alignment film by using the wall-like alignment film stopper, which is formed at the same time of the columnar spacer, on the side of the counter substrate of the liquid crystal display panel. At this time, it is possible to prevent the wall-like alignment stopper from blocking the spread of the sealing material when the TFT substrate and the counter substrate are bonded together. As a result, the sealing material can be formed uniformly.

At the same time, a concave portion is formed on the side of the TFT substrate at the position corresponding to the wall-like alignment film stopper formed on the side of the counter substrate. The concave portion can be used as the alignment film stopper on the side of the TFT substrate. In this way, it is possible to achieve a liquid crystal display device with little gap variation in the seal portion and with high reliability of the seal portion.

DETAILED DESCRIPTION

Hereinafter, the details of the present invention will be described with reference to the preferred embodiments.

First Embodiment

Figure 1:
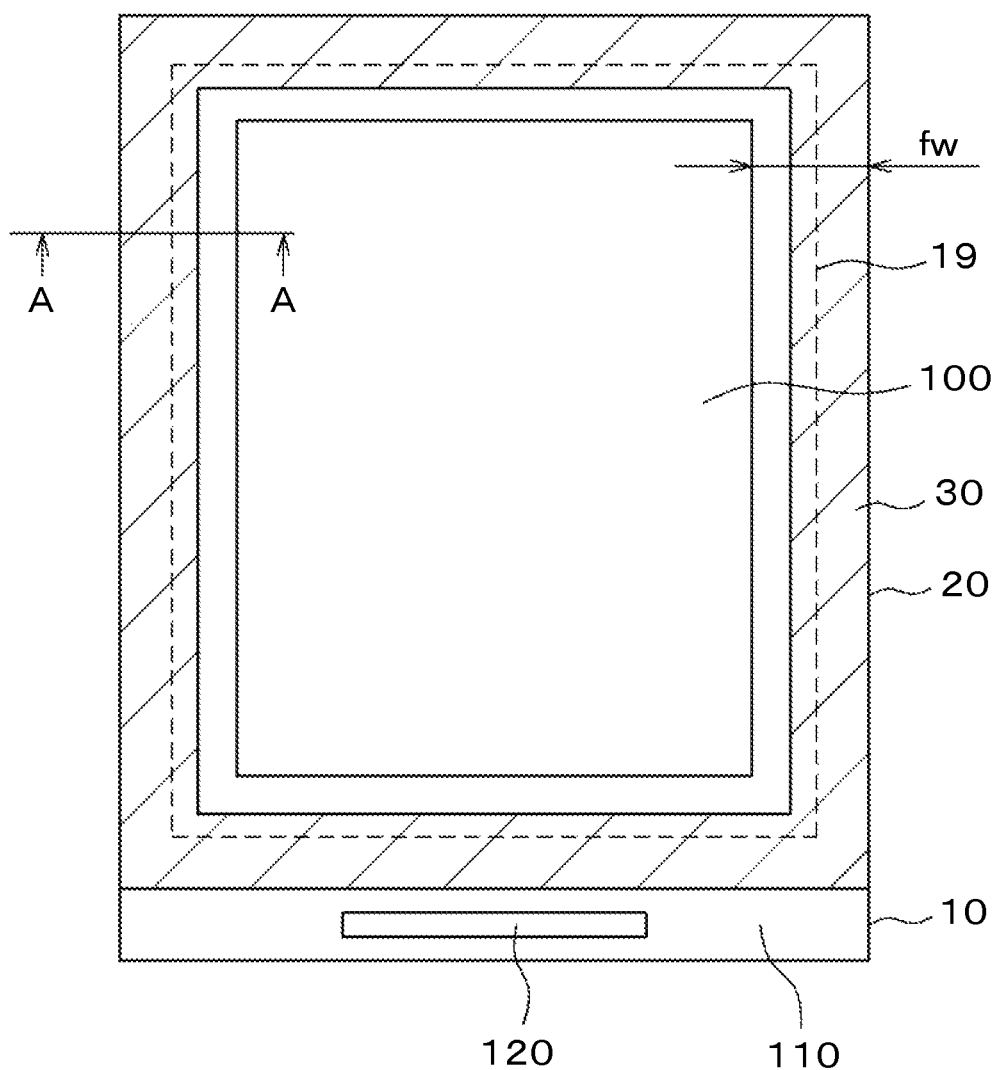
FIG. 1 is a plan view of a liquid crystal display device according to the present invention.

FIG. 1 is a plan view of a liquid crystal display panel to which the present invention is applied. In FIG. 1, a TFT substrate 10 and a counter substrate 20 are bonded together with a sealing material 30 not shown. Then, a liquid crystal layer is interposed between the TFT substrate 10 and the counter substrate 20. The TFT substrate 10 is formed larger than the counter substrate 20. A terminal portion 110 is formed in a portion of the TFT substrate 10 that does not overlap the counter substrate 20. An IC driver 120 for driving the liquid crystal display panel, a terminal (not shown) for connecting a flexible wiring substrate, and the like, are formed in the terminal portion 110. The flexible wiring substrate supplies power, image signals, scan signals, and the like, to the liquid crystal display panel.

In FIG. 1, a sealing material 30 is formed in the end portion of the counter substrate 20 and the TFT substrate 10 around a display area 100. The distance fw from the end portion of the display area 100 to the end portion of the counter substrate 20, or the so-called frame, is 1.5 mm or less. The width of the sealing material 30 is exaggerated in FIG. 1, but actually is about 0.6 mm. In order to reduce the width of the frame fw, an alignment film 19 and the sealing material 30 overlap each other and the amount of overlap is about 0.07 mm.

Figure 2:
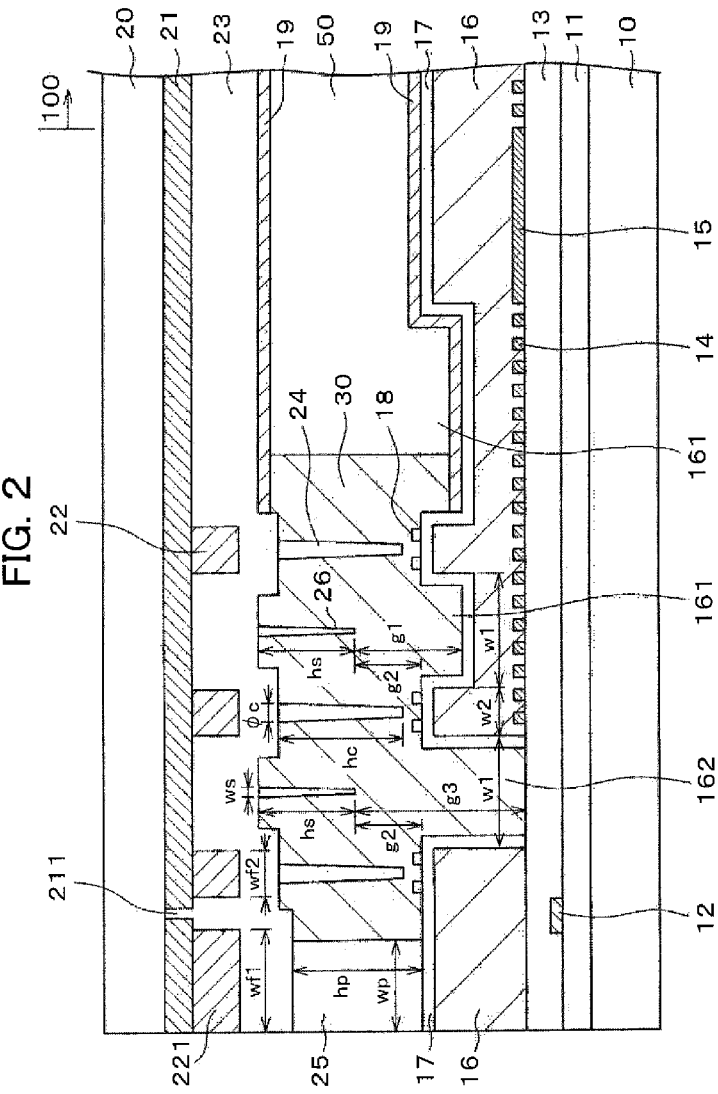
FIG. 2 is a cross-sectional view taken along line A-A of FIG. 1 in a first embodiment.
Figure 3:
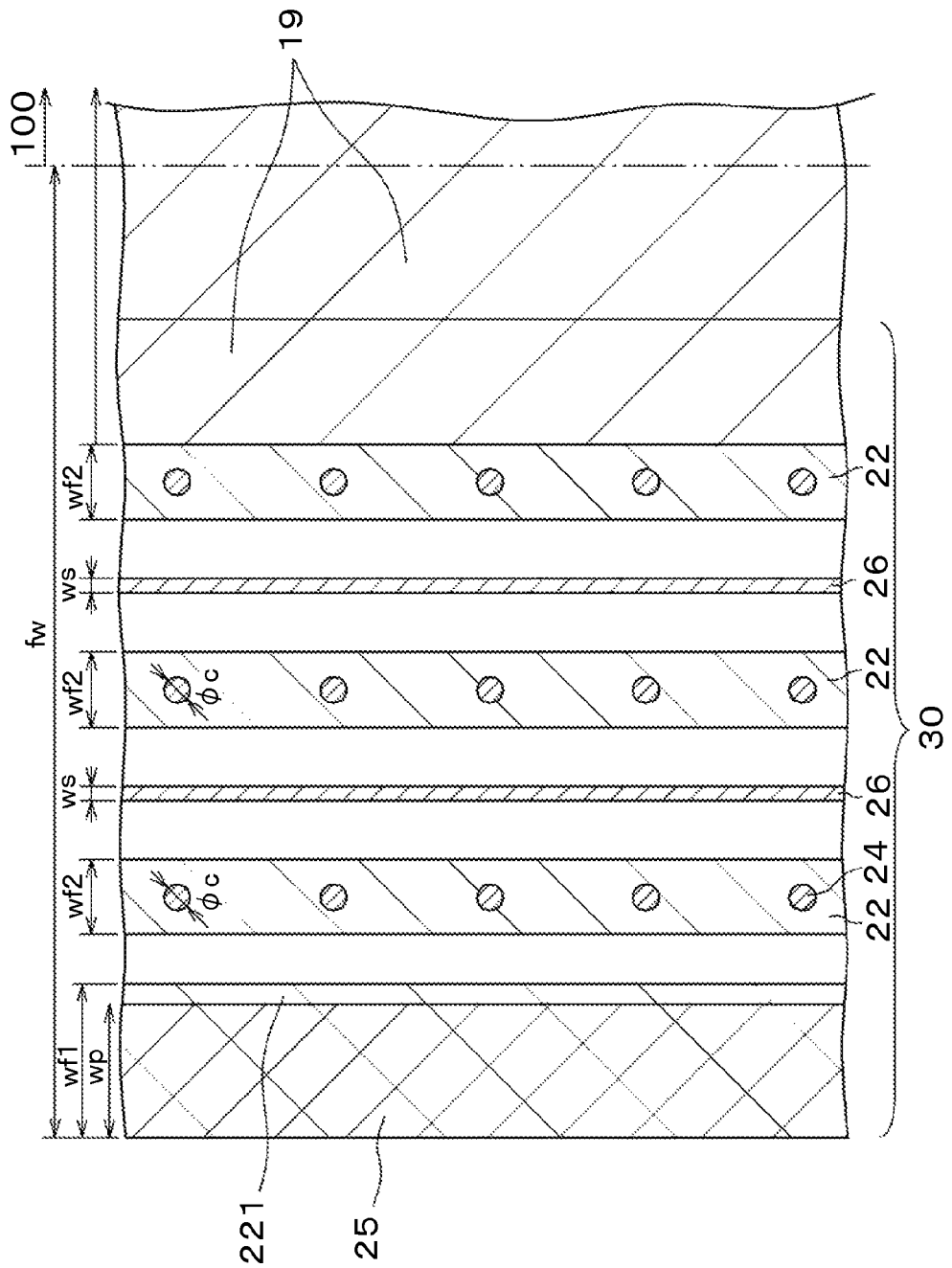
FIG. 3 is a plan view of a portion of a counter substrate corresponding to the A-A cross section of FIG. 1.

FIG. 2 is a detailed cross-sectional view of the seal portion, corresponding to the A-A cross-sectional view of FIG. 1. FIG. 3 is a plan view on the side of the counter substrate 20 in the vicinity of the A-A cross section shown in FIG. 2. In FIG. 2, the TFT substrate 10 and the counter substrate 20 are bonded together with the sealing material 30. A black matrix 21 is formed in the counter substrate 20. A black matrix removal portion 211 is present in the vicinity of the black matrix 21. Moisture or other liquid enters from the outside through the black matrix 21. However, the penetration of the moisture or other liquid is blocked by the black matrix removal portion 211.

Color filters 22 extending in the direction perpendicular to the paper are formed on the black matrix 21 in a stripe-like manner. FIG. 3 shows the color filters 22 extending in a stripe-like manner. There are four stripe-like color filters 22 formed on the black matrix 21, in which the width wf1 of an outermost color filter 221 is the largest at 120 μm, and the width wf2 of the other color filters 22 is 50 μm. For example, a blue color filter is used for the color filter 22. Note that in FIGS. 2 and 3, the color filters in the display area 100 are omitted. In FIG. 3, fw represents the width of the frame area from the end of the display area 100 to the end of the counter substrate 20.

In FIG. 2, an overcoat film 23 is formed to cover the color filter 22. The thickness of the overcoat film 23 is about 1 μm. On the other hand, the thickness of the color filter 22 is about 2 μm, so that concave and convex portions are formed in the overcoat film 23 by the color filter 22. A columnar spacer 24 is formed to provide the gap between the TFT substrate 10 and the counter substrate 20 in the peripheral portion, corresponding to the position where the color filter 22 is formed. The cross section of the columnar spacer 24 has a substantially circular shape with a diameter of about 10 μm in the root portion.

An outer peripheral spacer 25 does not have a columnar shape and is formed along the end portion of the four sides of the counter substrate 20 in a stripe shape, in the direction perpendicular to the paper as shown in FIG. 3. The width wp of the outer peripheral spacer 25 is 100 μm, which is greater than the diameter φc of the columnar spacer 24 of 10 μm. In this way, the width wp of the outer peripheral spacer 25 is greater than the diameter of the columnar spacer 24, so that the height of the outer peripheral spacer 25 tends to be greater than the height of the columnar spacer 24. Further, the outer peripheral spacer 25 is formed on the overcoat film 23 that is formed on the outermost color filter 221. The outermost color filter 221 is large in width. Thus, the film thickness of the overcoat film 23 formed on the outermost color filter 221 is large relative to the overcoat film 23 formed on the other color filters 22.

Figure 4:
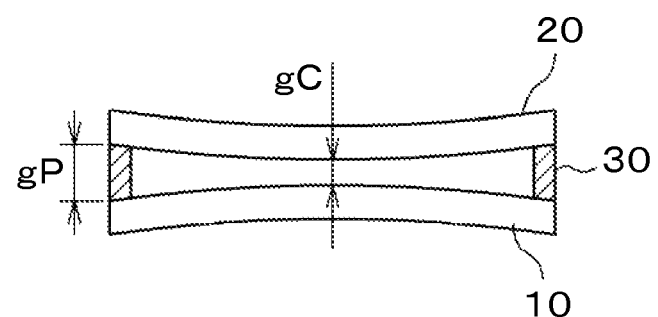
FIG. 4 is an example of a cross-sectional view of a liquid crystal display panel according to the present invention.

As a result, the gap between the TFT substrate 10 and the counter substrate 20 is slightly large in the peripheral portion as shown in FIG. 4, so that the liquid crystal display panel is convex toward the inside as a whole. In other words, in FIG. 4, the gap between the TFT substrate 10 and the counter substrate 20 varies in such a way that the gap gp in the peripheral portion is greater than the gap gc in the center. Since the liquid crystal display panel has a convex shape toward the inside, it is possible to reduce the variation of the gap between the TFT substrate 10 and the counter substrate 20 when external stress is applied to the liquid crystal display panel.

Now, refer back to FIG. 2. The wall-like alignment film stopper 26, which has a wall-like structure in the direction parallel to the side of the counter substrate, is formed in an area where the color filter 22 is not present, on the overcoat film 23. The alignment film stopper 26 is formed in a wall shape in the direction perpendicular to the paper. The alignment film stopper 26 is formed so as to surround the display area 100 in the vicinity of the end portion of the counter substrate 20. This state is shown in FIG. 3. In FIGS. 2 and 3, the profile of the alignment film 19 on the side of the counter substrate 20 is provided by the convex portion formed in the overcoat film 23. In the case of the alignment film material flowing out beyond the convex portion, the alignment film material is blocked by the wall-like alignment film stopper 26 to provide the profile of the alignment film 19.

As shown in FIGS. 2 and 3, two wall-like alignment film stoppers 26 are formed inside and outside. In the case of the alignment film material flowing out beyond the alignment film stopper 26, the alignment film material is blocked by the alignment film stopper 26 on the outside to provide the profile of the alignment film 19. The alignment film stopper 26 is formed of the same material as the columnar spacer 24. However, the height of the alignment film stopper 26 is less than the height of the columnar spacer 24. The height of the columnar spacer 24 is, for example, about 3 μm, and the height of the alignment film stopper 26 is, for example, about 2.6 μm. The columnar spacer 24 and the wall-like alignment film stopper 26 are formed at the same time in such a way that the height of the alignment film stopper 26 is reduced by half exposure.

If the alignment film stopper 26 is too high, the sealing material 30 before curing, which is a viscous solid, is prevented from flowing by the wall-like alignment film stopper 26 when the TFT substrate 10 and the counter substrate 20 are bonded with the sealing material 30 with a predetermined gap therebetween. As a result, the sealing material does not spread uniformly. On the other hand, the columnar spacer 24 has a columnar shape as shown in FIG. 3, so that the movement of the sealing material 30 is not prevented. FIGS. 2 and 3 show that the sealing material 30 bypasses the columnar spacer 24 and a portion of the sealing material 30 overlaps the alignment film 19.

In FIG. 2, an undercoat film 11 is formed in the TFT substrate of glass. The undercoat film 11 prevents impurities from entering the semiconductor layer of the TFT, not shown, from the glass substrate. A light shielding film 12 is formed on the undercoat film 11. The light shielding film 12 is formed at the position corresponding to the black matrix removal portion 211 of the counter substrate 20. This is in order to prevent the reduction of the contrast when the light from the backlight is output to the surface of the liquid crystal display panel from the black matrix removal portion 211. The light shielding film 12 is formed at the same time and of the same material as the scan lines, not shown, formed in the display area 100.

A gate insulating film 13 is formed on the light shielding film 12 and the undercoat film 11. A line 14 and a common line 15 are formed on the gate insulating film 13. The line 14 provides a signal to the display area of the liquid crystal display panel. The common line 15 provides a common voltage. An organic passivation film 16 is formed on the gate insulating film 13 and the line 14. In addition to protecting the TFT (not shown) and the lines, the organic passivation film 16 also has the role as a flattening film and is formed thick with a thickness of 2 to 3 μm.

FIG. 2 shows an example of a structure of a so-called in plane switching (IPS) mode. The problem of the liquid crystal display device is the so-called viewing angle. The IPS mode controls the amount of light passing through the liquid crystal layer by rotating the liquid crystal molecules in the direction parallel to the substrate, and has excellent properties for the viewing angle.

The IPS mode has the steps of: forming a first electrode in a matted manner on the organic passivation film 16; forming a second electrode with a comb-teeth shape or slits, through an inorganic insulating film 17 which is an interlayer insulating film; and controlling light passing through each pixel by rotating the liquid crystal molecules by the transverse electric field generated between the first and second electrodes when a voltage is applied to the first and second electrodes. When the first electrode is a common electrode, the second electrode is a pixel electrode. On the other hand, when the first electrode is a pixel electrode, the second electrode is a common electrode.

In FIG. 2, the inorganic insulating film 17 is the interlayer insulating film. The thickness of the inorganic passivation film is about 140 nm to 200 nm, which is far less than the thickness of the organic passivation film. The columnar spacer 24 formed in the counter substrate 20 provides the gap between the counter substrate 20 and the TFT substrate 10, by coming into contact with the inorganic insulating film 17 formed on the organic passivation film 16. Note that the wall-like peripheral spacer 25 and the inorganic insulating film 17 formed on the organic passivation film 16 come into contact to provide the gap between the TFT substrate 10 and the counter substrate 20 in the peripheral portion.

The profile of the alignment film 19 on the side of the TFT substrate 10 is provided by a concave portion formed in the organic passivation film 16 as well as a removal portion of the organic passivation film 16. A concave portion 161 and removal portion 162 of the organic passivation film 16 are formed in a groove shape, in the direction parallel to the side of the TFT substrate 10. In other words, the walls formed inside the concave portion 161 and removal portion 162 of the organic passivation film 16, respectively, serve as alignment film stoppers. In FIG. 2, two concave portions 161 are formed in the organic passivation film 16, and one removal portion 161 is formed on the outside of the concave portion 161. The organic passivation film 16 is thick with a thickness of about 2 to 3 μm. Thus, the concave portion 161 can be formed with a depth of about 1 to 1.5 μm, which can be used as the alignment film stopper. In other words, triple alignment stoppers are formed on the side of the TFT substrate 10. When the profile of the alignment film 19 may not be controlled by the first concave portion 161, it is possible to control the profile of the alignment film 19 by the second concave portion 161 and further by the removal portion 162.

A transparent electrode 18 of indium tin oxide (ITO) is formed on the inorganic insulating film 17 to extend in the direction perpendicular to the paper. This is formed at the same time as the formation of the second electrode with a comb shape or slits in the display area. An ITO 18 has poor compatibility with the alignment film 19 compared to the inorganic insulating film 17. Thus, it is possible to prevent the alignment film material from easily flowing beyond the convex portion, which is generated as a result of the formation of the concave portion 161 in the organic passivation film 16. The film thickness of the ITO 18 is about 40 nm to 50 nm.

The concave portion 161 and removal portion 162 of the organic passivation film 16 are formed so as to avoid the columnar spacer 24 formed in the counter substrate 20. The second concave portion 161 from the inside, as well as the removal portion 162 of the organic passivation film 16 are formed at the position corresponding to the wall-like alignment film stopper 26 formed in the counter substrate 20. Because moisture or other liquid enters from the outside through the organic passivation film 16, the removal portion 162 is formed in the organic passivation film 16 as shown in FIG. 2 to block the moisture or other liquid in the removal portion 162, thereby preventing the moisture or other liquid from penetrating into the display area 100 of the liquid crystal display panel.

In the present invention, the concave portion 161 and removal portion 162 formed in the organic passivation film 16 have an important role in the TFT substrate 10, in addition to providing the profile of the alignment film 19. In other words, as shown in FIG. 2, if the concave portion 161 and removal portion 162 of the organic passivation film 16 are not present, the distance between the wall-like alignment film stopper 26 formed in the counter substrate 20 and the inorganic insulating film 17 formed on the organic passivation film 16 is g2, and the gap is small. In this case, the sealing material 30, which is a viscous solid before curing, is prevented from spreading by the wall-like alignment film stopper 26 formed in the counter substrate 20. As a result, the sealing material 30 is unevenly present, so that the gap between the TFT substrate 10 and the counter substrate 20 varies in the seal portion.

In the present invention, the concave portion 161 or the removal portion 162 is formed in the organic passivation film 16 on the side of the TFT substrate 10, at the position corresponding to the wall-like alignment film stopper formed in the counter substrate 20. Thus, the distance between the wall-like alignment film stopper 26 and the bottom of the concave portion 161 is increased to g2 or g3, respectively. As a result, the sealing material 30, which is a viscous solid before curing, can spread through between the wall-like alignment film stopper 26 and the TFT substrate 10. In this way, the sealing material 30 can be uniformly formed when the TFT substrate 10 and the counter substrate 20 are bonded together with the sealing material 30.

Further, in the structure shown in FIG. 2, the wall-like alignment film stopper 26 is formed at the position where the stripe-like color filter 22 is not present in the counter substrate 20, so that it is possible to form a larger gap between the wall-like alignment film stopper 26 and the TFT substrate 10. According to the structure of the present invention shown in FIG. 2, it is possible to form a gap in the range of 2 μm to 2.5 μm between the end of the wall-like alignment film stopper 26 and the TFT substrate 10. Thus, the sealing material 30, which is a viscous solid before curing, can easily move between the wall-like alignment film stopper 26 and the TFT substrate 10. The gap between the wall-like alignment film stopper 26 and the TFT substrate 10 in the removal portion 162 of the organic passivation film can be made larger than the gap in the concave portion 161. It is preferable that the gap between the end of the wall-like alignment film stopper 26 and the TFT substrate 10 is 2 μm or more, in the portion where the concave portion 161 of the organic passivation film 16 is formed or in the removal portion 162 of the organic passivation film 16.

In FIG. 2, the width w1 of the concave portion 161 or removal portion 162 of the organic passivation film 16 is, for example, 120 μm, and the width w2 of the convex portion of the organic passivation film generated as a result of the formation of the concave portion 161 and the removal portion 162 in the organic passivation film 16 is, for example, 50 μm.

In FIG. 2, the sealing material 30 is formed bypassing the columnar spacer 24 to the position where a portion of the sealing material 30 overlaps the alignment film 19. The inside of the sealing material 30 is filled with liquid crystal. The position separated from the inside of the sealing material 30 by a predetermined distance is the display area 100.

Second Embodiment

Figure 5:
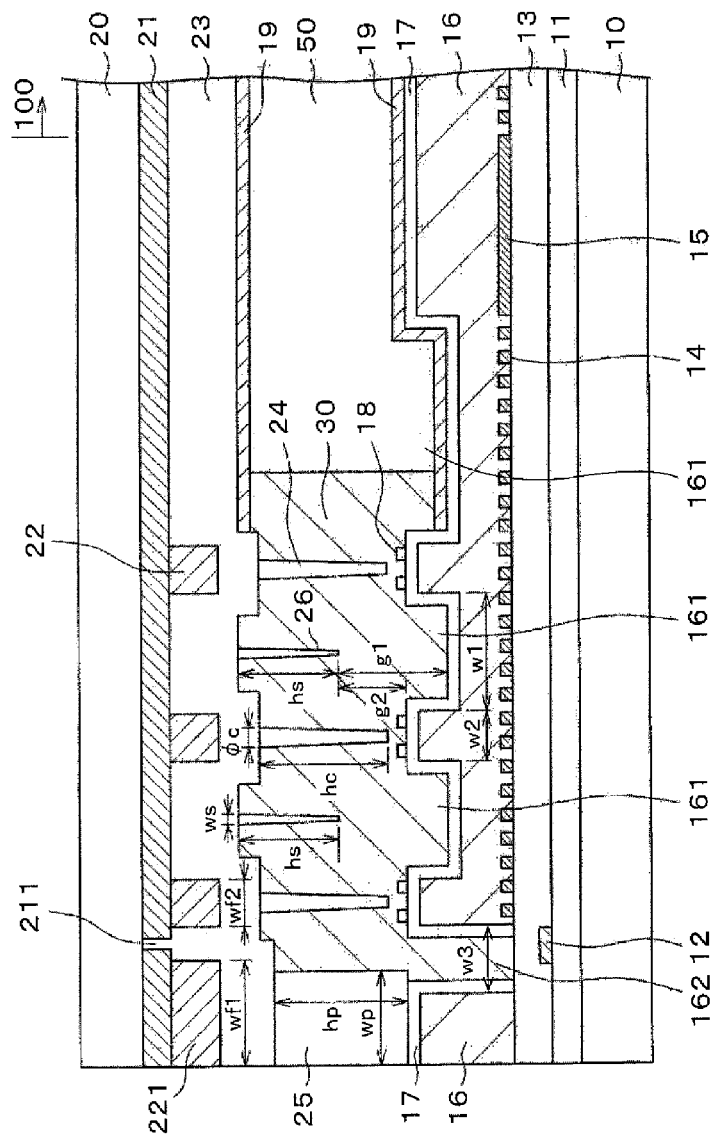
FIG. 5 is a cross-sectional view taken along line A-A of FIG. 1 in a second embodiment.

FIG. 5 is a cross-sectional view of the seal portion, which shows a second embodiment of the present invention. FIG. 2 corresponds to the A-A cross section of FIG. 1. FIG. 5 is different from FIG. 2 of the first embodiment in the concave portion 161 and removal portion 162 formed in the organic passivation film 16 in the TFT substrate 10. In FIG. 5, the concave portions 161 are formed at three positions, and the removal portion 162 is formed on the outside of the three concave portions 161. In other words, in FIG. 5, the part blocking the alignment film is formed at four positions as seen from the cross section. However, taking into account the bonding strength of the sealing material 30, it is preferable that the alignment film material is blocked by the inner concave portion 161 as much as possible.

In FIG. 5, the wall-like alignment film stopper 26 formed in the counter substrate 20 is formed at the position corresponding to the concave portion 161 of the organic passivation film 16 of the TFT substrate 10. In the first embodiment, one wall-like alignment film stopper 26 is formed at the position corresponding to the concave portion 161 of the organic passivation film 16, and the other wall-like alignment film stopper 26 is formed in the removal portion 162 of the organic passivation film 16. However, in the present embodiment shown in FIG. 5, both of the two wall-like alignment film stoppers 26 are formed at the positions corresponding to the concave portions 161 of the organic passivation film 16 on the side of the TFT substrate 10. The effect is substantially the same.

In FIG. 5, the wall-like alignment film stopper 26 is not formed at the position corresponding to the removal portion 162 of the organic passivation film on the side of the counter substrate 20. Thus, the width w3 of the removal portion is not necessarily the same as the width w1 of the concave portion, and may be less than w1. In other words, any width is possible as long as the moisture or other liquid is prevented from entering from the outside through the organic passivation film 16.

Further, the profile of the alignment film 19 is provided by the convex portion of the overcoat film 23 formed by the color filter line 22 on the side of the counter substrate 20. The present embodiment is the same as the first embodiment in that the alignment film material is blocked by the wall-like alignment film stopper 26 when the alignment film 19 extends beyond the convex portion.

In the first and second embodiments, two wall-like alignment film stoppers 26 are formed in the counter substrate 20 as seen from the cross section. However, one wall-like alignment film stopper 26 or three or more wall-like alignment film stoppers 26 can be formed. The number of wall-like alignment film stoppers 26 can be determined by how much the width of the frame area is reduced.

FIGS. 2, 5 and other figures have been described by taking the liquid crystal display device of IPS mode as an example. However, the present invention is not limited to the IPS mode and can be applied to liquid crystal display devices of other modes. Note that in the IPS mode, a so-called photo alignment film may be used. The IPS mode liquid crystal display device does not require a so-called pretilt angle and is suitable for photo alignment.

The photo alignment provides uniaxial anisotropy to the alignment film, for example, by irradiation of polarized ultraviolet rays of 300 nm or less, to break the main chain of the alignment film formed of polyimide, and the like, in a predetermined direction. In this way, the surface of the alignment film is weakened by ultraviolet rays in the photo alignment, so that the bonding strength with the sealing material of the alignment film is reduced compared to the case of the rubbing alignment. Thus, the present invention is particularly effective in the liquid crystal display device with the alignment film subjected to photo alignment.

The cross-sectional shape of the columnar spacer may be circular or polygonal. Further, the columnar spacer may be a columnar spacer, or may be spindle shaped, or may have a flat shape in the top by cutting the spindle-shaped end portion. Further, the meaning of the phrase "the wall-like structure is parallel to the side of the counter substrate" indicates the direction in which the entire wall-like structure extends, including a shape being at a slight angle to the side of the counter substrate as well as a shape locally at an angle to the side.

What is claimed is:

1. A liquid crystal display device comprising:
   a TFT substrate including a TFT, an organic passivation film formed to cover the TFT, and a first alignment film;
   a counter substrate including a columnar spacer and a second alignment film; and
   a liquid crystal is interposed between the TFT substrate and the counter substrate,
   wherein
   the TFT substrate and the counter substrate are bonded together with a sealing material in a seal portion,
   first and second wall-like structures are formed in the seal portion of the counter substrate, in a direction parallel to a side of the counter substrate,
   a plurality of columnar spacers are formed in the seal portion of the counter substrate, arranged in a direction parallel to a side of the counter substrate,
   a first concave portion of the organic passivation film is formed at a position facing the first wall-like structure in the seal portion, in a direction parallel to a side of the TFT substrate,
   a second concave portion of the organic passivation film is formed at a position facing the second wall-like structure in the seal portion, in a direction parallel to a side of the TFT substrate, and
   a thickness of the seal portion at the position of the columnar spacer is thinner than a thickness of the seal portion at the position of the first and second wall-like structures.

2. The liquid crystal display device according to claim 1, wherein a portion of the sealing material overlaps the first alignment film or the second alignment film.

3. The liquid crystal display device according to claim 2, wherein heights of the first and second wall-like structures are less than heights of the columnar spacer.

4. The liquid crystal display device according to claim 3, wherein a stripe-like color filter is formed in the seal portion of the counter substrate,
   an overcoat film is formed on the stripe-like color filter, and
   the columnar spacer is formed on the stripe-like color filter with the overcoat film interposed therebetween.

5. The liquid crystal display device according to claim 4, wherein the first and second wall-like structures are formed at a position where the stripe-like color filter is not present.

6. The liquid crystal display device according to claim 1, wherein a distance between an end of the first or second wall-like structures and the TFT substrate at a position where a concave portion of the organic passivation film is formed is 2 μm or more.

7. The liquid crystal display device according to claim 1, wherein the liquid crystal display device is a liquid crystal display device of in-plane switching (IPS) mode.

8. The liquid crystal display device according to claim 7, wherein the first and second alignment films are subjected to photo alignment.

9. The liquid crystal display device according to claim 1, wherein
   a third concave portion of the organic passivation film is formed at a place nearer to a display area than the first concave portion and the second concave portion,
   wherein a part of the third concave portion overlaps with the sealing material and a remaining part of the second concave portion does not overlap with the sealing material.

10. The liquid crystal display device according to claim 1, wherein a transparent conductive film is formed between the columnar spacer and the organic passivation film in the seal portion.

11. The liquid crystal display device according to claim 1, wherein the first concave portion and the second concave portion of the organic passivation film have different depths.

* * * * *